UNITED STATES PATENT OFFICE.

EMIL von PORTHEIM, OF PRAGUE, AUSTRIA-HUNGARY.

METHOD FOR THE PRODUCTION OF ANHYDROUS HYDROSULFITES.

1,036,705.   Specification of Letters Patent.   Patented Aug. 27, 1912.

No Drawing.   Application filed November 21, 1910. Serial No. 593,515.

*To all whom it may concern:*

Be it known that I, EMIL VON PORTHEIM, a subject of the Emperor of Austria-Hungary, residing at Prague, in Bohemia, Austria-Hungary, have invented certain new and useful Improvements in Methods for the Production of Anhydrous Hydrosulfites; and I do hereby declare the following to be a full, clear, and exact description of the invention, such as will enable others skilled in the art to which it appertains to make and use the same.

It is well known that by heating an aqueous solution of bisulfites and formic acid, solutions are obtained of high reducing qualities, in which solutions the presence of hydro-sulfites has been supposed, without, however, having been proved. Now I have found that hydro-sulfites are obtained if in the above-mentioned reaction the presence of water as a dissolving agent is excluded. By proceeding in this manner anhydrous hydrosulfites are obtained.

The proceeding may be as follows: Sulfites or bi-sulfites are allowed to enter into reaction with formic acid, or formiates with sulfurous acid, or formiates with sulfites or bisulfites, or, lastly, sulfurous acid with formic acid in the presence of sulfites or formiates or other salts.

Example 1: A mixture of 104 parts by weight of dry sodium-bisulfite with 31.5 parts by weight of formiate of ammonium in alcohol of 96% is stirred and heated to boiling point for one hour, and during this time sulfurous acid is carefully introduced. After decanting, washing with alcohol and drying, an excellent yield of hydrosulfite of high concentration is obtained. Of course this latter is free from metals and their oxids.

When the suspension of sodium bi-sulfite is boiled in alcohol, $SO_2$ will be liberated and the resulting product will be the neutral sodium sulfite $Na_2SO_3$ which does not enter the reaction with the formiate. In order to retard this decomposition I introduce $SO_2$ into the solution, which does not, however, participate in the reaction, and is therefore omitted from the above equations.

Example 2: A mixture of 58.5 parts by weight of sodium-chlorid with a solution of 17 parts by weight of ammonia in alcohol of 90%, 64 parts by weight of sulfurous acid and 31.5 parts by weight of formiate of ammonium is intensively boiled for 1–2 hours. The hydrosulfite is ellutriated from the unchanged sodium-chlorid, is then decanted, washed with alcohol and freed from the alcohol by being heated *in vacuo* or in a current of dry air.

Example 3: An alcoholic solution of 17 parts by weight of ammonia is poured into an alcoholic solution of 64 parts by weight of dioxid of sulfur. To this mixture is added 68 parts by weight of formiate of potassium and the mixture is well stirred and heated to boiling point for several hours.

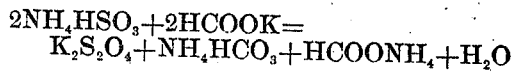

Example 4: 63 parts by weight of formiate of ammonium are heated to melting point, and in the molten mass 104 parts by weight of a finely powdered dry bisulfite of sodium are introduced. After a short time the hydrosulfite thus obtained is cooled down and is freed from salts of ammonium by subsequently being heated *in vacuo*. The product contains at least 80% of sodium hydrosulfite, having the known properties of this salt, is pure white in color and readily soluble in water. As impurities there are admixtures of reaction products and reagents consisting of thiosulfate of sodium, sulfate of sodium, sodium pyrosulfite and sodium chlorid.

The anhydrous hydro-sulfite results therefore from the reaction of a substance containing a formic acid radical (formic acid itself, or a formiate) with a substance containing sulfurous acid (sulfurous acid itself or a salt containing it) with or without the presence of other salts, water being excluded as a dissolving agent or menstruum, and in lieu thereof I preferably use alcohol.

I claim—

1. The method of producing hydrosulfites, which comprises reacting on a substance containing sulfurous acid with a substance containing a formic acid radical, said reaction taking place in the absence of water.

2. The method of producing hydro-sulfites, which comprises reacting on a substance containing sulfurous acid with formic acid radical in an alcoholic menstruum.

3. The method of producing hydrosulfites, which comprises reacting on a substance containing a sulfite with a substance containing a formic acid radical in the presence of sulfurous acid and in a menstruum of alcohol.

4. The method of producing hydrosulfites, which comprises reacting on a salt capable of forming a sulfite, with sulfurous acid, and a substance containing a formic acid radical in an alcoholic menstruum.

5. The method of producing hydrosulfites, which comprises reacting on a substance containing sulfurous acid with a substance containing a formic acid radical in a hot alcoholic menstruum.

6. The method of producing hydrosulfites, which comprises reacting on a sulfite with a substance containing a formic acid radical in the presence of sulfurous acid and in a boiling menstruum of alcohol.

7. The method, which comprises reacting on sodium sulfite with a substance containing formic acid radical in a hot alcoholic menstruum.

8. The method which comprises reacting on sodium chlorid with sulfurous acid in the presence of a substance containing formic acid radical and in an alcoholic menstruum.

9. The method, which comprises reacting with sulfurous acid upon a substance capable of forming a sulfite and a substance containing formic acid radical in a hot alcoholic menstruum.

10. The method, which comprises reacting with sulfurous acid upon a salt of an alkaline substance capable of forming a sulfite and with a substance containing formic acid radical and in a hot alcoholic menstruum.

In testimony that I claim the foregoing as my invention, I have signed my name in presence of two subscribing witnesses.

EMIL von PORTHEIM.

Witnesses:
JEAN GRUND,
CARL GRUND.